United States Patent
Sunwoo (10) Patent No.: US 12,186,944 B2
(45) Date of Patent: Jan. 7, 2025

(54) METHOD OF MANUFACTURING A TOY USING A MODEL FRAME IN LIQUID

(71) Applicant: Yoon Sunwoo, Seoul (KR)

(72) Inventor: Yoon Sunwoo, Seoul (KR)

( * ) Notice: Subject to any disclaimer, the term of this patent is extended or adjusted under 35 U.S.C. 154(b) by 278 days.

(21) Appl. No.: 17/635,690

(22) PCT Filed: Aug. 19, 2019

(86) PCT No.: PCT/KR2019/010482
§ 371 (c)(1),
(2) Date: Feb. 15, 2022

(87) PCT Pub. No.: WO2021/033788
PCT Pub. Date: Feb. 25, 2021

(65) Prior Publication Data
US 2022/0288818 A1    Sep. 15, 2022

(30) Foreign Application Priority Data
Aug. 16, 2019  (KR) .................. 10-2019-0100033

(51) Int. Cl.
*B29C 39/42* (2006.01)
*B29C 39/00* (2006.01)
(Continued)

(52) U.S. Cl.
CPC ............ *B29C 39/42* (2013.01); *B29C 39/003* (2013.01); *B29C 39/02* (2013.01); *B29C 39/22* (2013.01);
(Continued)

(58) Field of Classification Search
CPC ...................................................... C08L 5/04
See application file for complete search history.

(56) References Cited

U.S. PATENT DOCUMENTS

| | | | | |
|---|---|---|---|---|
| 5,310,421 A | * | 5/1994 | Shapero | C08L 5/04 106/217.7 |
| 10,207,252 B2 | * | 2/2019 | Mohammed | B01J 20/262 |
| 2021/0170640 A1 | * | 6/2021 | Tsai | A63H 33/001 |

FOREIGN PATENT DOCUMENTS

| | | | |
|---|---|---|---|
| CN | 110280028 A | * | 9/2019 |
| JP | 62-146572 A | | 6/1987 |

(Continued)

OTHER PUBLICATIONS

Machine translation of Sun Woo Yoon (KR 101947314 B1), Feb. 12, 2019 (Year: 2019).*
(Continued)

*Primary Examiner* — Benjamin A Schiffman
(74) *Attorney, Agent, or Firm* — Revolution IP, PLLC (57) ABSTRACT

A method of manufacturing a toy using a model frame in liquid includes: filling a water tank; dissolving calcium chloride, a powder component, into the water filled in the water tank; wherein the amount of calcium chloride is determined in anticipation of the degree of gelation by chemical action with sodium alginate, filling a liquid paint to the model frame; wherein the liquid paint is comprised water 96 wt. %, CNC 0.99 wt. %, sodium alginate 3 wt. %, luminous material 0.01 wt. % or water 91 wt. %, CNC 1 wt. %, sodium alginate 3 wt. %, shiny material 5 wt. % or water 96 wt. %, CNC 0.99 wt. %, sodium alginate 3 wt. %, color conversion material 0.01 wt. %; immersing the model frame filled with the liquid paint in the water tank; solidifying and shrinking the liquid paint filled in the model frame immersed in the water tank; and shaking the model frame.

1 Claim, 5 Drawing Sheets

(51) Int. Cl.
    *B29C 39/02*     (2006.01)
    *B29C 39/22*     (2006.01)
    *B29C 39/24*     (2006.01)
    *B29C 39/36*     (2006.01)
    *B29L 31/52*     (2006.01)
    *C08K 3/16*     (2006.01)
    *C08L 1/02*     (2006.01)
    *C08L 5/04*     (2006.01)
    *C09D 7/61*     (2018.01)
    *C09D 7/65*     (2018.01)
    *C09D 105/04*     (2006.01)
    *A63H 33/22*     (2006.01)

(52) U.S. Cl.
    CPC .............. *B29C 39/24* (2013.01); *B29C 39/36* (2013.01); *C08K 3/16* (2013.01); *C08L 1/02* (2013.01); *C08L 5/04* (2013.01); *C09D 7/61* (2018.01); *C09D 7/65* (2018.01); *C09D 105/04* (2013.01); *A63H 33/22* (2013.01); *B29K 2005/00* (2013.01); *B29K 2093/00* (2013.01); *B29L 2031/52* (2013.01); *B29L 2031/5281* (2013.01); *C08K 2003/162* (2013.01); *C08L 2205/025* (2013.01); *C08L 2205/035* (2013.01)

(56) References Cited

FOREIGN PATENT DOCUMENTS

| | | | | |
|---|---|---|---|---|
| JP | 3110152 | U | 6/2005 | |
| JP | 3224691 | U * | 1/2020 | |
| KR | 10-0309193 | B1 | 11/2002 | |
| KR | 10-2010-0115267 | A | 10/2010 | |
| KR | 10-2017-0059832 | A | 5/2017 | |
| KR | 10-1947314 | B1 | 2/2019 | |
| KR | 20220056779 | A * | 5/2022 | ........... A63H 33/001 |
| WO | WO-9316132 | A1 * | 8/1993 | ........... A63H 33/001 |
| WO | WO-2021033788 | A1 * | 2/2021 | ............. A63H 33/22 |

OTHER PUBLICATIONS

International Search Report for PCT/KR2019/010482 mailed May 13, 2020 from Korean Intellectual Property Office.

\* cited by examiner

METHOD OF MANUFACTURING A TOY USING A MODEL FRAME IN LIQUID

CROSS REFERENCE TO RELATED APPLICATIONS

This application is a National Stage Application of PCT International Patent Application No. PCT/KR2019/010482 filed on Aug. 19, 2019, under 35 U.S.C. § 371, which claims priority to Korean Patent Application No. 10-2019-0100033 filed on Aug. 16, 2019, which are all hereby incorporated by reference in their entirety.

BACKGROUND OF THE INVENTION

The present invention relates to a method of manufacturing a toy using a mold in liquid and an apparatus for performing a method.

In particularly, the present invention relates to a method of manufacturing a toy using a model frame in liquid and an apparatus for performing a method in which when a model frame filled with liquid paint having various colors is immersed in a liquid containing chemical substances, the toy conforming to the shape of the model frame is solidified after a certain period of time and is separated from the model frame and is maintained as a toy in liquid. Korea Patent Registration No. 10-0309193 relates to a method for manufacturing a toy mold. The model manufacturing method is comprised of steps: making a model with a material that is easy to process; coating a gold powder or silver mirror to the outer surface of the model; forming a mold to be attached a predetermined metal ion to the outer surface of the gold powder or silver mirror by putting the model coated with gold powder or silver mirror in a weakly acidic metal solution and by connecting the metal piece to the anode while immersing the metal piece of the same element as the metal solution in the solution spaced apart by a certain distance and by reacting for a predetermined time under a state that gold or silver mirror of the outer surface of the model is connected a cathode; separating the model from the mold; forming a metal reinforcing agent to the outer surface of the mold; removing impurities inside the mold; forming a protective film inside the mold; cleaning the inside of the mold with dilute acid.

Even for articles with complex shapes such as toys, molds with complex shapes can be easily manufactured using paraffin, gypsum, or plastics, etc. Since the mold is made of a material that is relatively easy to process, even a model with a complex shape can be precisely processed.

Since the mold is formed by attaching the metal ion, even a model with a complex internal structure can be precisely processed.

Korean Patent Laid-Open No. 10-2010-0115267 relates to a synthetic resin foam block for assembly toys manufactured using a plate-shaped synthetic resin foam and a method for manufacturing the same.

The synthetic resin foam block for assembling toys includes a lower body having one or more vertical through-holes, the upper and lower portions being flat, and composed of synthetic resin foam; upper body composed of synthetic resin foam for being attached to the upper surface of the lower body by a first adhesive layer and being formed at least one fitting protrusion insertion groove at a position corresponding to the vertical through hole; a fitting protrusion insertion composed of a circular rod-shaped synthetic resin foam for be inserted into each fitting protrusion insertion groove through the first adhesive layer; one or more fitting grooves composed of each of the through-holes and the lower surface of the upper body for being inserted the fitting projections.

The prior art provides the synthetic resin foam block for assembly toys using the general plate shape synthetic resin foam. Therefore, in the process of assembling each block, as each block has elasticity, the blocks can be interconnected and assembled with little force, so that infants or children can play with them easily. Furthermore, it is possible to provide a block with stability that can prevent injuries such as broken finger or nail in advance, and by enabling mass production of blocks with a simple process using a plate-shaped synthetic resin foam, a block composed of synthetic resin foam can be supplied to consumers at a low price.

However, these prior arts are related to manufacturing toys using a mechanical structure, and there is a disadvantage that a complex and expensive device is required.

An object of the present invention is to provide a method of manufacturing a toy using a model frame in liquid and an apparatus for performing a method in which when a model frame filled with liquid paints of various colors is immersed in a liquid containing chemical substances, a toy conforming to the shape of the model frame is solidified and separated from the model frame after a certain period of time.

Another object of the present invention is to provide a method of manufacturing a toy using a model frame in liquid and an apparatus for performing a method in which a liquid paints is contained

BRIEF SUMMARY OF THE INVENTION

In order to achieve the above objects, the present invention provides a method of manufacturing a toy using a model frame in liquid comprising the steps of:
  filling a water tank with a certain amount of water so that a model frame can be completely immersed;
  dissolving calcium chloride, a powder component, into the water filled in the water tank;
  wherein the amount of calcium chloride is determined in anticipation of the degree of gelation by chemical action with sodium alginate,
  filling a liquid paint to the model frame;
  wherein the liquid paint is comprised water 96 wt. %, CNC 0.99 wt. %, sodium alginate 3 wt. %, luminous material 0.01 wt. % or water 91 wt. %, CNC 1 wt. %, sodium alginate 3 wt. %, shiny material 5 wt. % or water 96 wt. %, CNC 0.99 wt. %, sodium alginate 3 wt. %, color conversion material 0.01 wt. %,
  wherein the liquid paint is added with a predetermined dye and has a predetermined viscosity;
  immersing the model frame filled with the liquid paint in the water tank;
  solidifying and shrinking the liquid paint filled in the model frame immersed in the water tank; and
  shaking the model frame so that the solidified and contracted toy is separated from the model frame;
  wherein the toy separated from the model frame maintains its shape in the liquid of the water tank, and is deformed when taken out of the water tank.

In order to achieve the above objects, the present invention provides an apparatus of manufacturing a toy using a model frame in liquid comprising:
  a water tank filled with a liquid in which calcium chloride, a powder component, is dissolved;
  a model frame for immersing in the water tank so that a toy conforming to the model frame after a certain period of time is solidified and contracted and for shaking so that the solidified and contracted toy is separated; and a liquid paint for filling to the model frame;

wherein the liquid paint is comprised water 96 wt. %, CNC 0.99 wt. %, sodium alginate 3 wt. %, luminous material 0.01 wt. % or water 91 wt. %, CNC 1 wt. %, sodium alginate 3 wt. %, shiny material 5 wt. % or water 96 wt. %, CNC 0.99 wt. % or water 96 wt. %, CNC 0.99 wt. %, sodium alginate 3 wt. %, color conversion material 0.01 wt. %, wherein the liquid paint is added with a predetermined dye and has a predetermined viscosity;

wherein the toy separated from the model frame maintains its shape in the liquid of the water tank, and is deformed when taken out of the water tank.

According the present invention, when a model frame filled with liquid paints of various colors is immersed in a liquid containing chemical substances, a toy conforming to the shape of the model frame is solidified and separated from the model frame after a certain period of time and children can play with it.

In addition, a liquid paints is contained luminous, shiny and color-converting materials are mixed so that children can play happily.

DETAILED DESCRIPTION OF THE INVENTION

Hereinafter, embodiments of the present invention will be described in detail with reference to the accompanying drawings.

The present invention is capable of various modifications and has several embodiments, and specific embodiments are illustrated in the drawings and described in detail in the detailed description.

However, this is not intended to limit the present invention to specific embodiments, it should be understood to include all modifications, equivalents, and substitutes included in the spirit and scope of the present invention.

The terms used in the present invention are only used to describe specific embodiments, and are not intended to limit the present invention.

The singular expression includes the plural expression unless the context clearly dictates otherwise. In the present application, terms such as "comprise" or "have" mean that there is a feature, number, step, operation, component, part, or combination thereof described in the specification. It should be understood that it may mean that there are one or more other features or numbers, steps, actions, components, parts, or combinations thereof, and there is also the possibility of addition.

Unless defined otherwise, all terms used herein, including technical or scientific terms, have the same meaning as commonly understood by one of ordinary skill in the art to which this invention belongs.

First Embodiment

Hereinafter, a first embodiment of the present invention will be described in detail with reference to the accompanying drawings.

Figure 1:
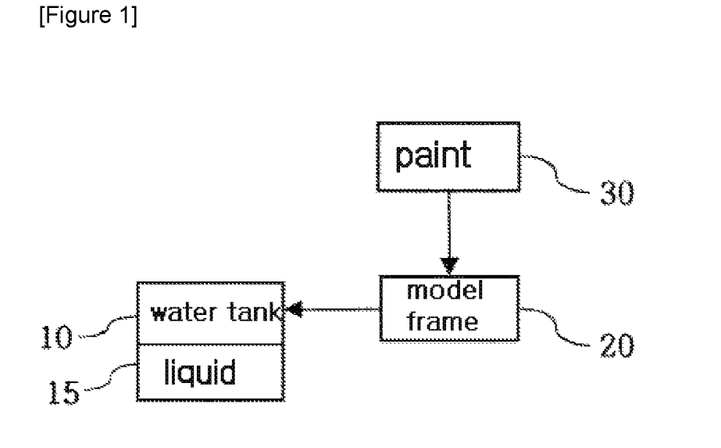
FIG. 1 is a block diagram of an apparatus for performing a method of manufacturing a toy using a model frame in a liquid according to a first embodiment of the present invention.

FIG. 1 is a block diagram of an apparatus for performing a method of manufacturing a toy using a model frame in a liquid according to a first embodiment of the present invention.

Figure 2:
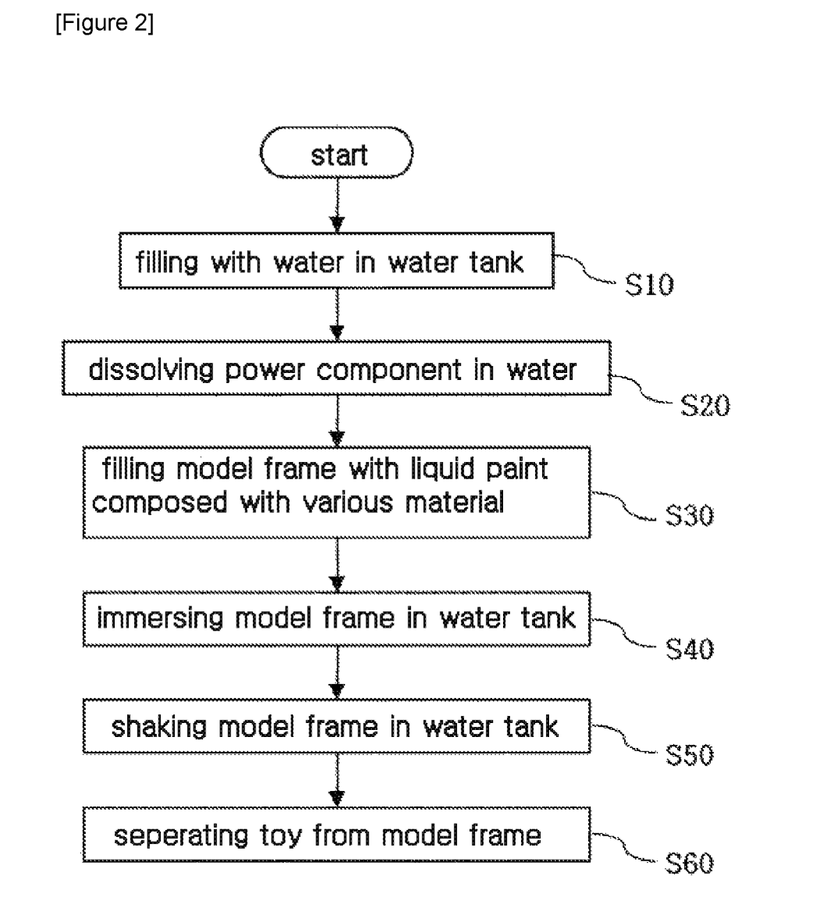
FIG. 2 is an operation flowchart for performing a method of manufacturing a toy using a model frame in a liquid according to a first embodiment of the present invention.

FIG. 2 is an operation flowchart for performing a method of manufacturing a toy using a model frame in a liquid according to a first embodiment of the present invention.

As shown in FIG. 1, an apparatus for performing a method of manufacturing a toy using a model frame in a liquid of the present invention is composed of a water tank 10, a mold frame 20, and paints 30.

The water tank 10 is for immersing the model frame 20, and it is preferable that a predetermined amount of water, that is, a liquid 15 sufficient to completely immerse the model frame, is filled.

The liquid 15 filled in the water tank 10 contains a powder component so that the liquid paint 30 filled in the model frame 20 is solidified when the model frame 20 is immersed in the water tank 10 The powder component may be calcium chloride ($CaCl_2$).

The model frame 20 is to allow the liquid paint 30 filled in the model frame to be solidified and separated while being immersed in the water tank 10, and is prepared to be manufactured a toy having various shapes that can be played by all player as well as infants and children.

The paint 30 is filled in the model frame 20 and is composed of a component to be reacted with the liquid 15 in the water tank 10 and solidify.

Preferably, the paint 30 may be mixed with water 96 wt. % containing a predetermined color, CNC 1 wt. %, and sodium alginate 3 wt. %.

CNC is wood pulp cellulose nanocrystals extracted from wood, the strongest materials known to date.

Sodium alginate is extracted from brown seaweed, and in the presence of calcium and acidic medium, it forms an elastic gel.

Sodium alginate is most commonly used with calcium lactate or calcium chloride in the spheronization process.

Sodium alginate is used as a shear-thinning thickener in the absence of calcium to gel in the presence of calcium, to stabilize emulsions or foams and to form films.

For example, in modern cuisine, sodium alginate is used with a calcium salt to create large spheres in the shape of small caviar.

TABLE 1

|  | water | CNC | sodium alginate |
| --- | --- | --- | --- |
| experiment 1 | 90 wt. % | 5 wt. % | 5 wt. % |
| experiment 2 | 85 wt. % | 10 wt. % | 5 wt. % |
| experiment 3 | 96 wt. % | 1 wt. % | 3 wt. % |

According to Experiments 1 to 3, when a paint mixed with water 96 wt. %, CNC 1 wt. %, and sodium alginate 3 wt. % was immersed to 1000 ml of a liquid in which 10 g of calcium chloride was dissolved, it was found that the degree of gelation was the best.

As shown in Experiment 1, when a paint mixed with water 90 wt. %, CNC 5 wt. % and sodium alginate 5 wt. % was immersed to 1000 ml of a liquid in which 10 g of calcium chloride was dissolved, the degree of gelation was not bad, but compared to Experiment 3 it was concluded that it was not easy to maintain the shape as a toy in a liquid because the degree of gelation was low.

As shown in Experiment 2, when a paint mixed with water 85 wt. %, CNC 10 wt. % and sodium alginate 5 wt. % was immersed to 1000 ml of a liquid in which 10 g of calcium chloride was dissolved, the degree of gelation was the worst among the three experiments.

All of Experiments 1 to 3 were performed by immersing the paint in liquid 1000 ml dissolved 10 g of calcium chloride, and the amount of liquid was determined to be sufficient to completely immerse the model frame, taking into account the size of the model frame representing the shape of a toy. The amount of calcium chloride was determined in anticipation of the degree of gelation by the chemical action with sodium alginate shown in Experiments 1 to 3.

Using these experimental examples, it will be described that the toy of the present invention is solidified and manufactured as follows.

When the paint 30 is prepared by mixing water 96 wt. %, CNC 1 wt. %, and sodium alginate 3 wt. %, the paint 30 becomes viscous and can be prevented from becoming easily separated from the model frame 20 or strongly adhered to the model frame 20.

After that, 10 g of calcium chloride is melt to 1000 ml of water filled in the water tank 10. Accordingly, the water filled in the water tank 10 is changed into a liquid 15 containing a chemical component that causes the paint 30 made of the mixture component to solidify.

After the paint 30 is filled in the model frame 20, it is immersed in the liquid 15 in the water tank 10.

After a predetermined time, the paint 30 filled in the model frame 20 is solidified and contracted slightly. At this time, if the model frame 20 is shaken slightly, the toy is separated from the model frame 20 and maintained a shape and function as a toy in the liquid 15.

Method of manufacturing a toy using the device of the present invention with reference to FIG. 2 will be described as follows.

First, a predetermined amount of water is filled in the water tank 10 (S10).

It is preferable that the amount of water to be filled in the water tank 10 is sufficient to completely immerse the model frame 20.

Next, a certain amount of a powder component is added to the water filled in the water tank 10 and dissolved by stirring well (S20).

Next, the pre-prepared model frame 20 is filled with liquid paints 30 of various colors (S30).

Filling the model frame 20 with the liquid paint 30 is not limited to a specific method, and any shape of the model frame 20 may be filled with the paint 30 of a color desired by the player.

Next, the model frame 20 filled with the liquid paint 30 is completely immersed in the liquid 15 filled in the water tank 10 (S40).

Next, after a certain period of time, the model frame 20 is slightly shaken left and right in the liquid 15 filled in the water tank 10 (S50).

Slightly shaking from left and right may be to prevent the liquid paint 30 filled in the model frame 20 from being separated from the model frame 20 before it solidifies. If you shake it up and down strongly, the degree of separation may be worse, so shake it slightly from left and right.

In addition, since the liquid paint 30 filled in the model frame 20 solidifies within a short time in the liquid 15 in which the powder component filled in the water tank 10 is dissolved, it is preferable to shake it slightly from left and right so that the toy is separated from the model frame 20.

Next, the solidified toy is separated from the model frame 20 and maintained in the liquid 15 in the water tank 10 to maintain the toy shape (S60).

On the other hand, when the toy of the present invention manufactured by gelation as described above is separated from the liquid 15 filled in the water tank 10, that is, when taken out from the water tank 10, it dries and disappears. Therefore, the toy manufactured according to the method of the present invention is always maintained in the water tank 10.

Second Embodiment

Hereinafter, a second embodiment of the present invention will be described in detail with reference to the accompanying drawings.

Figure 3:
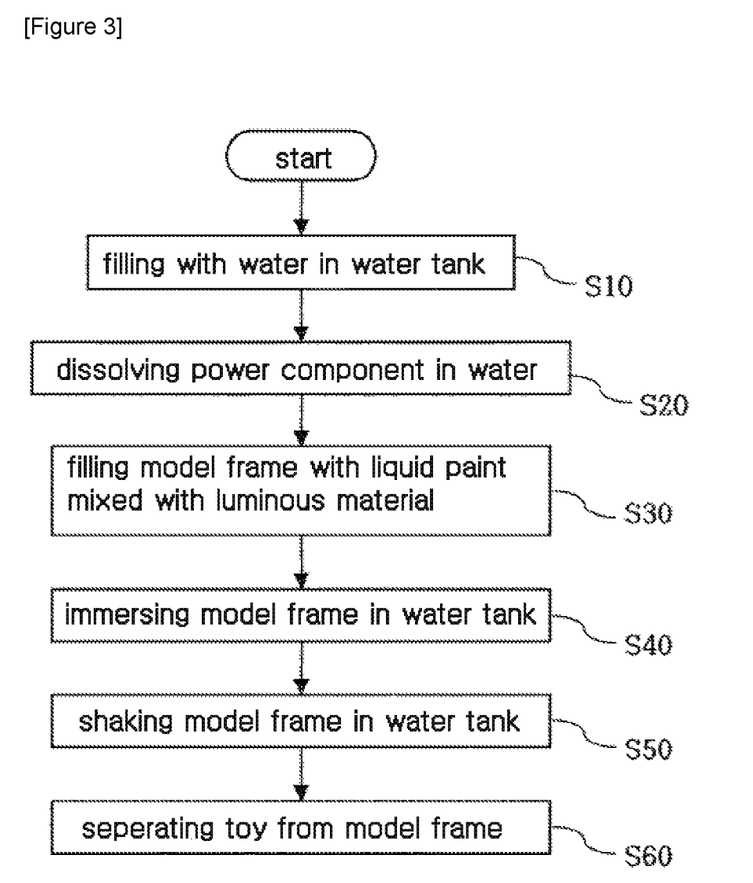
FIG. 3 is an operation flowchart for performing a method of manufacturing a toy using a model frame in a liquid according to a second embodiment of the present invention.

FIG. 3 is an operation flowchart for performing a method of manufacturing a toy using a model frame in a liquid according to a second embodiment of the present invention.

A second embodiment of the present invention uses the device of the first embodiment, and further mixes a luminous material to make the toy visible at night or in a dark environment, so that children can enjoy with it.

Water 96 wt. % (CAS NO: 7732-18-5), CNC 0.99 wt. % (CAS NO: 9004-65-3), sodium alginate 3 wt. % (CAS NO: 9005-38-3), luminous material 0.01 wt. % (CAS NO: 12004-37-4) are mixed.

That is, in the first embodiment, water 96 wt. %, CNC 1 wt. %, and sodium alginate 3 wt. % were mixed in the paint, but in the second embodiment, the ratio of water is kept as it is and the CNC ratio is reduced as much as the luminous material mix.

The luminous material may be in the form of a powder. It can be used by selecting from a mixture of Zinc sulfide (ZnS)+copper (Cu)+potassium silicon oxide (K2 SiO2) and a mixture of calcium sulfide (CaS)+vismuth (Bi) and a mixture of strontium calcium sulfide (CaSrS)+vismuth (Bi).

The toy manufactured in this way generates a luminous light while maintaining its shape in the liquid 15 in the water tank 10 so that children can play happily even in a place without light.

Third Embodiment

Hereinafter, a third embodiment of the present invention will be described in detail with reference to the accompanying drawings.

Figure 4:
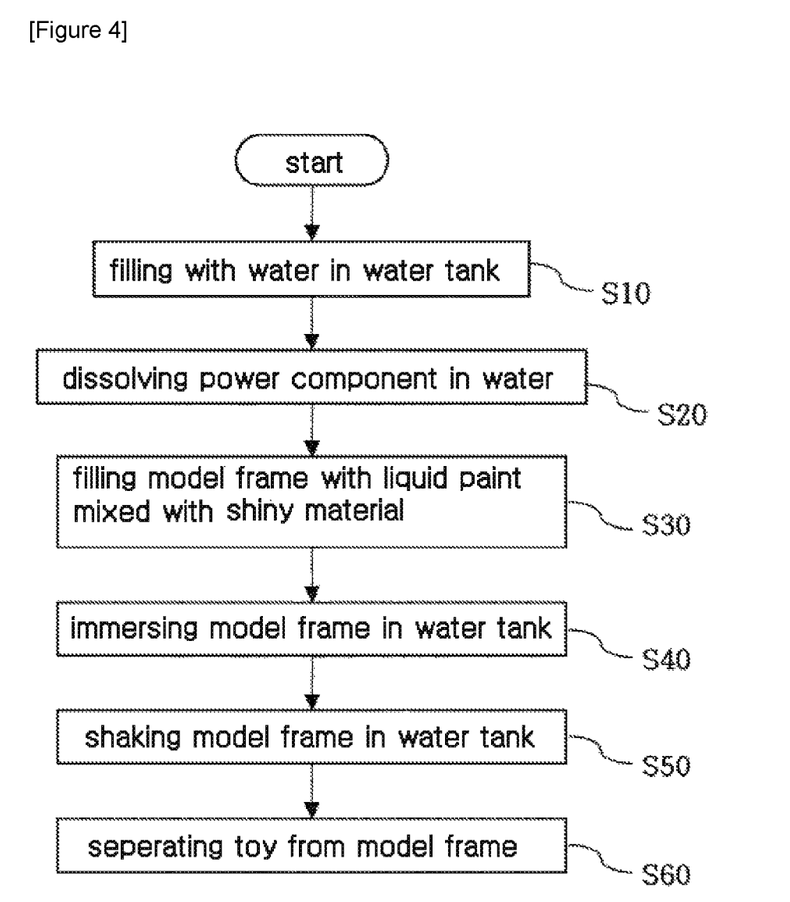
FIG. 4 is an operation flowchart for performing a method of manufacturing a toy using a model frame in a liquid according to a third embodiment of the present invention.

FIG. 4 is an operation flowchart for performing a method of manufacturing a toy using a model frame in a liquid according to a third embodiment of the present invention.

A third embodiment of the present invention uses the device in the first embodiment above, and further mixes a shiny material so that the toy emits a sparkling light, so that children can have fun.

Water 91 wt. % (CAS NO: 7732-18-5), CNC 1 wt. % (CAS NO: 9004-65-3), sodium alginate 3 wt. % (CAS NO: 9005-38-3), shiny (glitter) material 5 wt. % (CAS NO: 12597-70-5) are mixed.

That is, in the first embodiment, water 96 wt. %, CNC 1 wt. %, sodium alginate 3 wt. % were mixed in the paint, but in the second embodiment, the ratio of CNC and sodium alginate is kept as it is and the amount of water is reduced as much as shiny material mix.

The shiny material may be in the form of a powder, and exhibits a function of imparting a sparkling effect, that is, a bling-bling visual effect.

As the glitter powder used in the present invention, it is possible to use various glitter powders distributed in the market, and it is also possible to use a mixture of glitter powders having various colors.

Glitter powder is included in 5 wt. %, and when the content of glitter powder is less than 5 wt. %, it is weak to give a bling-bling effect, and when it exceeds 5 wt. %, the dispersibility of the glitter powder may be lowered.

The toy manufactured as described above exhibits a sparkling characteristic while maintaining its shape in the liquid 15 in the water tank 10 so that children can play happily.

Fourth Embodiment

Hereinafter, a fourth embodiment of the present invention will be described in detail with reference to the accompanying drawings.

Figure 5:
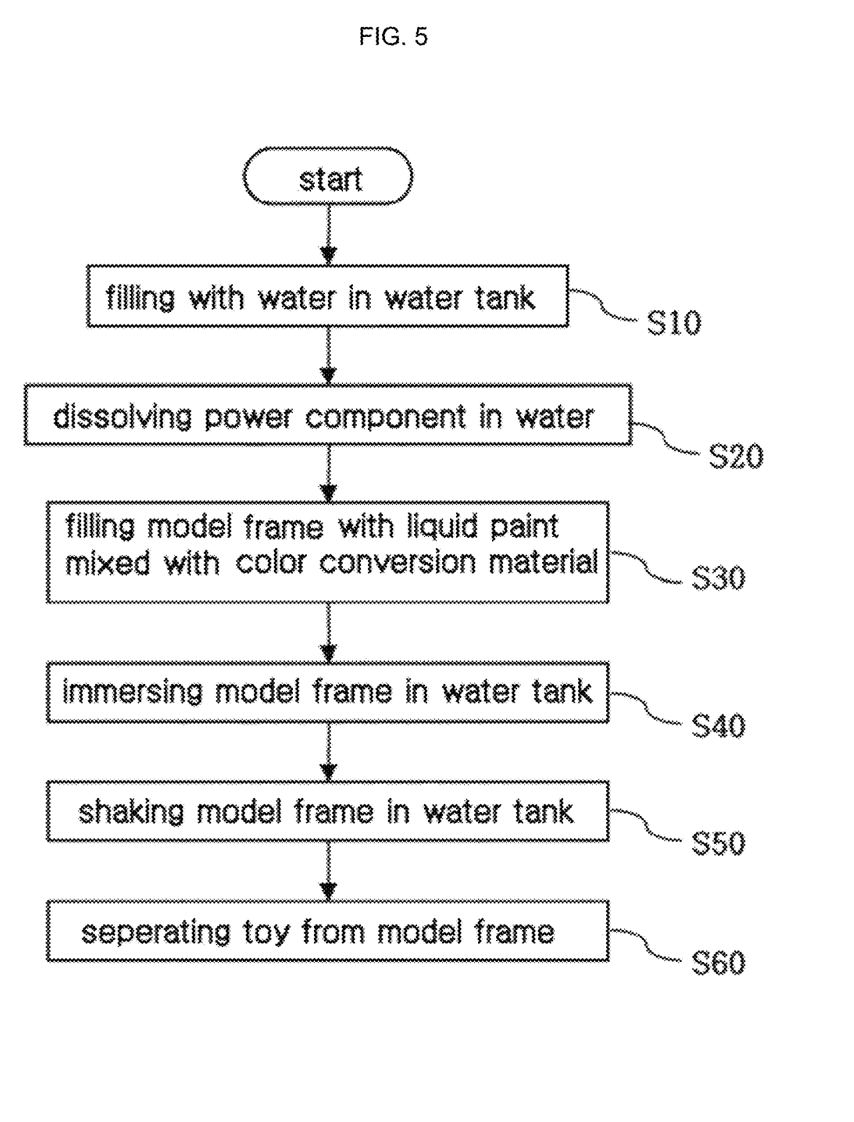
FIG. 5 is an operation flowchart for performing a method of manufacturing a toy using a model frame in a liquid according to a fourth embodiment of the present invention.

FIG. 5 is an operation flowchart for performing a method of manufacturing a toy using a model frame in a liquid according to a fourth embodiment of the present invention.

The fourth embodiment of the present invention uses the apparatus of the first embodiment as it is, and further mixes a color conversion material to convert the toy into various colors so that children can enjoy playing.

Water 96 wt. % (CAS NO: 7732-18-5), CNC 0.99 wt. % (CAS NO: 9004-65-3), sodium alginate 3 wt. % (CAS NO: 9005-38-3), color conversion material 0.01 wt. % (CAS NO: 7340-41-4) are mixed.

That is, in the first embodiment, water 96 wt. %, CNC 1 wt. %, and sodium alginate 3 wt. % were mixed in the paint, but in the fourth embodiment, the ratio of water and sodium alginate is kept as it is, and the color conversion material is mixed as much as the ratio of CNC is reduced.

The color conversion material used in the present invention may be a reversible Zion pigment, and it can be manufactured to have a principle that the color changes as the temperature of the liquid in the water tank changes or when children touch a toy located in the water tank with their hands.

The color conversion composition of the present invention includes, for example, 8 to 15% by weight of each of two or more Zion pigments having different temperature zones and colors per the paint 100 wt. %, Silica sand 35 to 40 wt. %; 18 to 25 wt. % of curing agent; and 7 to 10 wt. % of titanium dioxide. The Zion pigment is determined according to whether the temperature reduction or temperature increase is the sensitivity condition criterion for property expression and the color mixing color scheme of the entire composition. The color of the paint and the number of Zion pigments included in the paint are determined according to the number of color combinations selected by the color mixing scheme.

The toy manufactured as described above exhibits a color conversion effect while maintaining its shape in the liquid 15 in the water tank 10 so that children can play happily.

Embodiments of a method for manufacturing a toy using a mold in a liquid and an apparatus for performing the method have been described. The embodiments described above are illustrative of some of the many specific embodiments that represent the principles described herein. Accordingly, by using the embodiments of the present invention, those skilled in the art will be able to easily realize many other arrangements within the scope defined by the claims of the present invention.

The present invention relates to a method of manufacturing a toy using a model frame in liquid and a device for performing a method and is applicable in toy manufacturing industry in which when a model frame filled with liquid paint having various colors is immersed in a liquid containing chemical substances, the toy conforming to the model frame's shape is solidified after a certain period of time and separated from the model frame and performing function as a toy in liquid. The present invention also serves advantages that children can play happily because the paint is contained luminous, shiny and color-converting materials.

What is claimed is:

1. A method of manufacturing a toy using a model frame in liquid comprising the steps of:
    filling a water tank with a certain amount of water so that a model frame can be completely immersed;
    dissolving calcium chloride, a powder component, into the water filled in the water tank;
    wherein the amount of calcium chloride is determined in anticipation of the degree of gelation by chemical action with sodium alginate,
    filling a liquid paint into the model frame;
    wherein the liquid paint is comprised water 96 wt. %, CNC 0.99 wt. %, sodium alginate 3 wt. %, luminous material 0.01 wt. % or water 91 wt. %, CNC 1 wt. %, sodium alginate 3 wt. %, shiny material 5 wt. % or water 96 wt. %, CNC 0.99 wt. %, sodium alginate 3 wt. %, color conversion material 0.01 wt. %,
    wherein the liquid paint is added with a predetermined dye and has a predetermined viscosity;
    immersing the model frame filled with the liquid paint in the water tank;
    solidifying and shrinking the liquid paint filled in the model frame immersed in the water tank; and
    shaking the model frame so that the solidified and contracted toy is separated from the model frame;
    wherein the toy separated from the model frame maintains its shape in the liquid of the water tank, and is deformed when taken out of the water tank.

* * * * *